US010571309B2

(12) United States Patent
Grau

(10) Patent No.: US 10,571,309 B2
(45) Date of Patent: Feb. 25, 2020

(54) DEVICE FOR MEASURING ROTATIONAL ANGLES IN COUNTERS AND MULTI-STAGE ROTARY ENCODERS AS WELL AS ASSOCIATED SENSORS

(71) Applicant: Guenter Grau, Dorsten (DE)

(72) Inventor: Guenter Grau, Dorsten (DE)

( * ) Notice: Subject to any disclaimer, the term of this patent is extended or adjusted under 35 U.S.C. 154(b) by 307 days.

(21) Appl. No.: 15/553,224

(22) PCT Filed: Feb. 22, 2016

(86) PCT No.: PCT/EP2016/053656
§ 371 (c)(1),
(2) Date: Feb. 26, 2018

(87) PCT Pub. No.: WO2016/135088
PCT Pub. Date: Sep. 1, 2016

(65) Prior Publication Data
US 2018/0188078 A1 Jul. 5, 2018

(30) Foreign Application Priority Data

Feb. 25, 2015 (DE) .................. 10 2015 102 709
May 20, 2015 (DE) .................. 10 2015 107 908

(51) Int. Cl.
*G01D 5/34* (2006.01)
*G01J 4/04* (2006.01)

(52) U.S. Cl.
CPC ............... *G01D 5/345* (2013.01); *G01J 4/04* (2013.01)

(58) Field of Classification Search
CPC .................................. G01D 5/345; G01J 4/04
See application file for complete search history.

(56) References Cited

U.S. PATENT DOCUMENTS

| 5,815,269 | A | 9/1998 | Crabb et al. |
| 8,759,742 | B2 | 6/2014 | Yokogawa |

(Continued)

FOREIGN PATENT DOCUMENTS

| DE | 102005031996 | 1/2007 |
| DE | 102005063524 | 1/2011 |

(Continued)

OTHER PUBLICATIONS

"German Search Report," for Priority Application No. DE102015107908.9 dated Oct. 26, 2015 (7 pages).

(Continued)

*Primary Examiner* — Georgia Y Epps
*Assistant Examiner* — Don J Williams
(74) *Attorney, Agent, or Firm* — Pauly, DeVries Smith & Deffner LLC

(57) ABSTRACT

Various embodiments relate to devices for measuring the state of devices and multi-stage rotary encoders as well as to associated sensors. In order to simplify the design of devices which can be read out electronically and multi-turn rotary encoders, according to some embodiments a device having at least one rotatable wheel, at least one light source and at least one polarization sensor is proposed, the wheel being at least partially transparent and polarization-maintaining, parts of the wheel being configured as pole filters, it being possible for light which exits the light source to be polarized by the pole filter and to be received by the polarization sensor.

20 Claims, 7 Drawing Sheets

(56) References Cited

U.S. PATENT DOCUMENTS

| | | |
|---|---|---|
| 2005/0002032 A1 | 1/2005 | Wijntjes et al. |
| 2005/0211886 A1* | 9/2005 | Chin .................... G01D 5/345 |
| | | 250/231.13 |
| 2012/0175496 A1 | 7/2012 | Vorovitchik et al. |

FOREIGN PATENT DOCUMENTS

| | | |
|---|---|---|
| EP | 0143354 | 6/1985 |
| EP | 1457762 | 9/2004 |
| EP | 2631606 | 8/2013 |
| FR | 2954493 | 6/2011 |
| GB | 1601058 | 10/1981 |

OTHER PUBLICATIONS

"International Search Report and Written Opinion," for Corresponding PCT Application No. PCT/EP2016/053656 dated May 17, 2016 (21 pages).

* cited by examiner

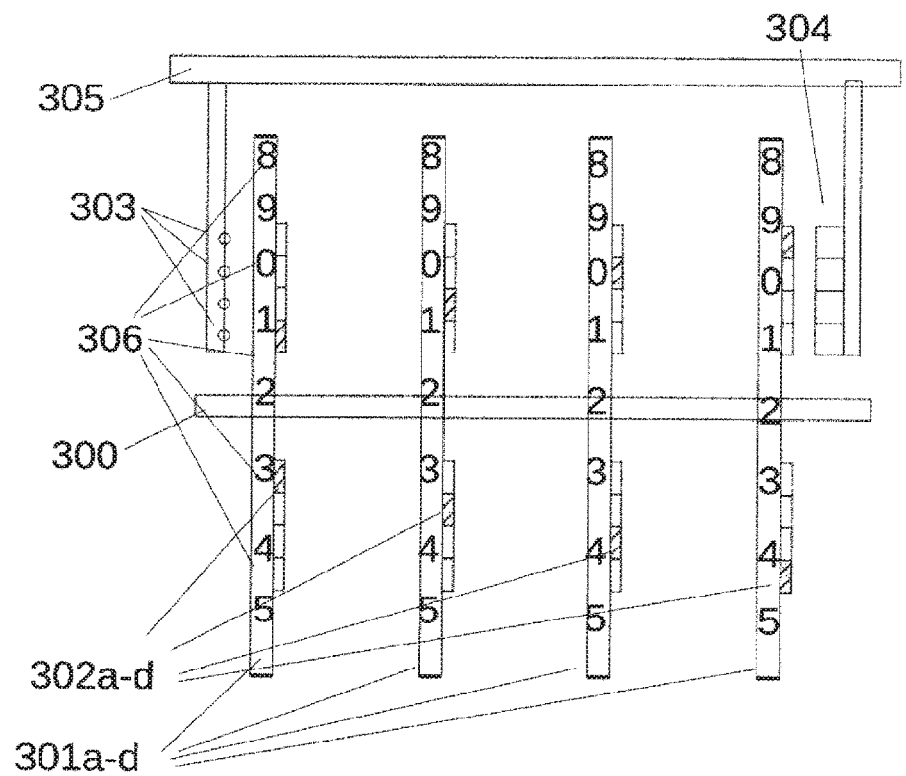
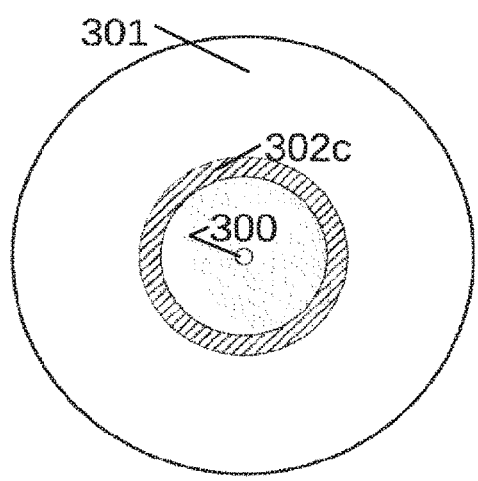
Fig. 3a
Fig. 3b
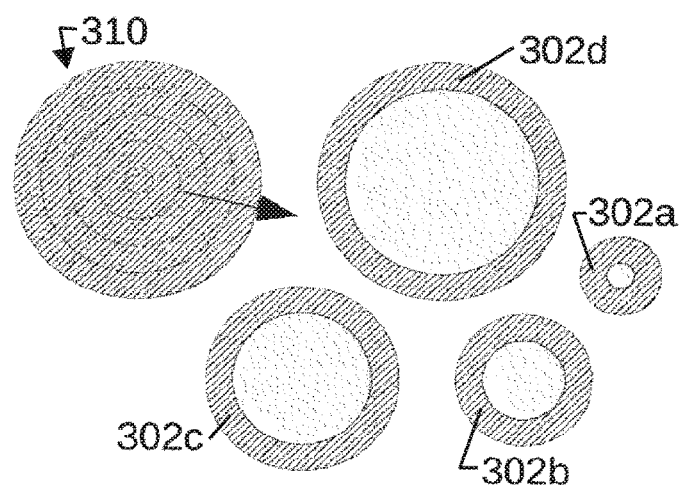
Fig. 3c

DEVICE FOR MEASURING ROTATIONAL ANGLES IN COUNTERS AND MULTI-STAGE ROTARY ENCODERS AS WELL AS ASSOCIATED SENSORS

CROSS-REFERENCE TO RELATED APPLICATIONS

This application is a national stage application under 35 U.S.C. 371 of International Patent Application Serial No. PCT/EP2016/053656, entitled "Device For Measuring Angles Of Rotation In Counters And Multiphase Rotary Encoders And Associated Sensors," filed Mar. 4, 2016, which claims priority from German Patent Application No. DE 10 2015 102 709.7, filed Feb. 25, 2015, and from German Patent Application No. DE 10 2015 107 908.9, filed May 20, 2015, the disclosures of which are incorporated herein by reference.

FIELD OF THE TECHNOLOGY

The present disclosure relates to the field of devices for measuring the state of counters and multi-stage rotary encoders as well as to associated sensors. Specifically, the disclosure relates to a device having more than one rotatable wheel, at least one light source and more than one polarization sensor, as well as a device having more than one rotatable wheel and in each case having measuring wheels which can be connected thereto mechanically by means of a ratio of 2:1, at least one light source and more than one polarization sensor. In addition, the disclosure relates to a use of a device for measuring rotational angles and/or revolutions.

BACKGROUND

In many applications it is not sufficient to be able to determine rotational angles over e.g. a half or full revolution. In order to carry out an unambiguous measurement of a plurality of revolutions, for example in an electricity meter or the spindle of a linear drive, it is also possible to use, in addition to electronic counting devices which are based on the signals of a simple angle measuring device, mechanical counters and transmissions. These have the advantages that they retain the counter reading even without a supply of energy and can even carry on counting without a supply of energy to the sensor system. This may be very important if in the event of a fault an inert machine continues to move while the sensor system is not functioning as a result of a power failure, or if the state of a machine is changed in the switched-off state.

In the text which follows, not only the state of a machine but in an equivalent fashion also the state of the device is mentioned, i.e. the state of the counter or of the transmission. Said state is described, for example, by means of the measurement of the individual rotational angles of all the wheels of a counter or gearwheels of a transmission.

Counters are also used in linear sensors, for example cable travel measuring devices, in order to expand their measuring range. As a rule, they do not permit any direct manual evaluation of the state because the compactness and complexity of the electronic detection of the counter reading in devices which can be read off manually is even greater than in the case of electronic evaluation, with the result that in this context there are either solutions which can be read electronically or solutions which can be read purely manually.

However, counters which can be read manually or mechanical counters are of interest in many fields because they operate with little maintenance and risk and independently of an additional power supply as well as permitting easy monitoring of the function or of the counter reading. Examples are, for instance, gas meters and water meters in which electrification would be conceivable most likely with battery operation or by means of energy harvesting, but associated with high costs and relatively high maintenance expenditure as well as, under certain circumstances, safety problems as a result of an increased risk of explosions or leakage. Even in the case of the abovementioned cable encoders in many applications there could be a measured value if the counting value could be read off not only purely electronically but also visually on the counter, even if the counter itself is without power.

The measurement of revolution angles in multi-digit counters and in transmissions of multi-turn rotary encoders currently entails high expenditure. As a rule, each counting wheel or each gearwheel of a device is equipped with an independent absolute-value angle sensor, with the result that e.g. a multiplicity of encoder disks, collimated light sources and precisely adjusted multi-track sensors is necessary, which additionally have to communicate with one another in order to eliminate ambiguities as a result of gear play etc. This constitutes considerable expenditure and makes such systems expensive.

The reason for this complicated type of design is the fact that conventional angle sensors can measure reliably only over short and constant distances. It is thus scarcely possible to read off the field of a magnetic code disk with a diameter of e.g. 1 cm from a distance of 1 cm with good accuracy because the magnetic field has dropped to very low values at this distance. If a plurality of magnet disks are to be arranged one behind the other, the signals would interfere with one another. Signals of classic optical encoders (transmissive or reflective with multi-track code disks) can also be read off from a relatively large distance only with a high adjustment complexity and precise optics because scattered light and measuring errors quickly predominate as a result of incorrect adjustment. However, this can be carried out to a limited degree. For example, EP143354 describes the superimposition of signals of two transmission stages. However, even more wide ranging multi-stage superimposition generates even more quickly increasing complexity of the design. In EP1457762 the distance between different code disks and the respective sensor is reduced by cylindrical elements with different radii to the distance which is customary for simple encoders. This requires a multiplicity of precisely fitting elements, requires them to be assembled to form complicated three-dimensional structures and does not permit any simple cascading to form higher step numbers with a kit system.

SUMMARY

An object of the present disclosure is to simply the design of electronically readable devices and multi-turn rotary encoders. This can achieved by means of a device as described herein.

According to an embodiment, the object is solved by a device having at least one rotatable wheel, at least one light source and at least one polarization sensor, the wheel being at least partially transparent and polarization-maintaining, parts of the wheel being configured as pole filters, it being possible for light which exits the light source to be polarized by the pole filter and to be received by the polarization sensor. In particular, the object is achieved by means of a device having more than one rotatable wheel, at least one light source and more than one polarization sensor, the wheels being at least partially transparent and polarization-maintaining, parts of the wheels being configured as pole filters, the wheels at least partially overlapping, it being possible for light which exits the light source to be polarized by the pole filters in the wheels and to be received by the polarization sensors, it being possible for the light to penetrate a plurality of wheels, and the light which is received by a polarization sensor being polarized by just one of the pole filters. If it is stated that light which exits the light source can be polarized by the pole filters of the wheels, it is meant that the transparent and polarization-maintaining regions and the regions of different wheels which are configured as pole filters are dimensioned and arranged in such a way that light which exits the light source can be polarized by the pole filters of the wheels.

The wheel can be a counting wheel of a counting device.

As a result of the measurement of absolute values, the pole filter takes up a smaller space than an encoder code disk and can be measured with a relatively small sensor. The adjustment sensitivity drops because the same signal can be measured at every location on the polarization filter. Since there is no need for measurement with extremely fine spatial resolution, the signal can be measured over a larger distance than is the case with optical encoders. Therefore, the light beam can overcome a plurality of additional transparent hurdles on the way from the light source to the sensor as long as the hurdles do not significantly change the polarization of the light. If a plurality of wheels are mounted on a common axle, the respective pole filters can have different radii so that a common light source and a common sensor array or sensors which are located one next to the other can be used for the measurement.

Consequently, in contrast to optical encoders or magnetic sensors it is not necessary for the signal to be acquired in the direct vicinity of the sensor, which leads, for example in EP 1 457 762, to a complicated and non-planar design. In the present case, the various wheels can be used in a planar shape, it being possible for a different number of transparent and polarization-maintaining regions of the other wheels to lie between the light source and the respective pole filter or this filter and the associated sensor. In other words, the light of a first wheel can be polarized in the vicinity of the light source and passes through a series of further wheels without changing the polarization state, while the light of the last wheel is located in the vicinity of the sensor, and the unpolarized light is not polarized until just before the sensor, after it passes through the other wheels. The individual wheels can be essentially of the same design here, in particular implemented as a disk. In the case of mounting on the same axis, only the radii of the respective pole filters should advantageously be adapted.

In this context, transparency is necessary at least for the wavelength range used by the sensor. If the sensor operates in the infrared range, the disk certainly cannot be transparent for the eye. Therefore, for example in the case of the counter the other white numbers are implemented on a black background, but the wheels are to be fabricated totally from a material which is transparent to the infrared light of the sensor.

According to an embodiment, additional coding elements are provided on at least one wheel and sensors which match them and generate an unambiguous measuring range over 360° are provided.

Since the polarization measurement has 180° periods, but a measurement which is unambiguous over 360° is often necessary, an additional signal can be used to produce this periodicity. This can be done in a variety of ways. Without increasing the area required for the wheel to be measured, a brightness modulation can be superimposed on the pole filter, for example by means of relatively strong absorption on a semicircle. In a similar way, it is also possible to carry out color coding which permits the two semicircles to be differentiated. However, it is more practical to use at least one second signal track on the wheel with another radius, which signal track is configured similarly to a binary data track of a classic optical encoder, for example in a fully transparent and completely blocking fashion. The brightness information which is superimposed on the polarization can be measured with the polarization sensor itself, while color information can be determined by means of wavelength-selective sensors. If a second signal track is used, a further sensor in addition to the polarization sensor is useful. Since brightness can also be measured with a polarization sensor, said further sensor can, however, also be a second polarization sensor. In this case, a signal track with a segmented pole filter would also be possible. Numerous configuration variations lead to the desired result.

According to an embodiment, the object is achieved by means of a device having at least one rotatable wheel and a measuring wheel which is connected mechanically thereto by means of a ratio of 2:1, at least one light source and at least one polarization sensor, the measuring wheel being at least partially transparent and polarization-maintaining, parts of the measuring wheel being configured as a pole filters, it being possible for light which exits the light source to be polarized by the pole filter and to be received by the polarization sensor. In particular, the object is achieved by means of a device having more than one rotatable wheel and in each case having measuring wheels which are connected thereto mechanically by means of a ratio of at least 2:1, at least one light source and more than one polarization sensor, the measuring wheels being at least partially transparent and polarization-maintaining, parts of the measuring wheels being configured as pole filters, the measuring wheels at least partially overlapping, it being possible for light which exits the light source to be polarized by the pole filters of the measuring wheels and to be received by the polarization sensors, it being possible for the light to penetrate a plurality of measuring wheels, and the light which is received by a polarization sensor being polarized by just one of the pole filters. If it is stated that light which exits the light source can be polarized by the pole filters of the wheels, it is meant that the transparent and polarization-maintaining regions and the regions of various wheels which are configured as pole filters are dimensioned and arranged in such a way that light which exits the light source can be polarized by the pole filters of the wheels.

In order to eliminate the requirement of an auxiliary signal for 360° non-ambiguity, the polarization measurement can take place on a further wheel, the measuring wheel, wherein the latter can rotate with at most half the speed of the rotatable (counting) wheel. This can be ensured by suitable toothing between the wheels. If a separate measuring wheel is provided for each counting wheel of a counter, a rotational speed ratio 2:1 is particularly favorable. This is appropriate, for example, in arrangements where various counting wheels are coupled to one another by a separate mechanism or a separate transmission. In the case of decadic counters, the rotational speed ratio is usually 10:1 in this context, with the counting wheels often being driven by stepping gears. The coupling between counting wheel and measuring wheel can be made by means of a simple toothing arrangement.

If the rotational speed ratio is greater than 2:1, possibly greater by an integral factor, an angular measurement which is unambiguous over more than 360° of a rotational range of the counting wheel can take place by means of the polarization measurement on the measuring wheel. This is particular advantageous in the case of multi-turn rotary encoders which are often equipped with multi-step transmissions.

According to one refinement of the devices described above
a plurality of wheels are arranged in such a way that they partially overlap,
the transparent and polarization-maintaining regions and the regions of various wheels which are configured as pole filters are dimensioned and arranged in such a way that light which exits a light source can also penetrate a plurality of wheels, the light which is received by a polarization sensor being polarized by just one of the pole filters,
it being possible for the light which is polarized by various wheels to be measured at various locations.

Depending on the mechanical configuration of the wheels, pole filters and auxiliary tracks on different wheels may be located on a common rotational axis or else on different rotational axes. As a result, very compact devices can be built in which signals from different pole filters and/or auxiliary tracks can be measured one next to the other without them interfering with one another. This also permits the use of common light sources and multi-channel sensors. The fact that measurement takes place at locations at which the light has to penetrate a plurality of wheels is, of course, not necessary. It is both possible for measuring wheels to be located outside the counting wheels and for them to overlap. The mechanical coupling is to be suitably constructed here by the person skilled in the art, it being possible for not only toothing arrangements but also toothed belts and other structures with the same effect to be used.

Since the polarization functions equally on axis and off axis, a measurement on the rotational axis (radius zero) is possible.

According to one refinement of the devices described above, symbols are provided at 180° periods on the circumference of a wheel.

In the case of counters such as e.g. decadic counters, numerical symbols 0 . . . 9 are usually provided on the circumference of a counting wheel so that the state of the counter can be read out manually. In this case, a 360° rotation is required in order to run through the counting range of a wheel, and the individual counting wheels are usually subjected to a 10:1 step-down ratio in accordance with the symbols. In order to be able to dispense with auxiliary signals, auxiliary tracks or additional stepped-down wheels when using polarization sensors, it is useful to change the counting wheels, during which change the symbols are provided with 180° periods, i.e. the numerical sequence 0 . . . 9 appears twice in succession at each rotation through 360°. Correspondingly, the stepping down of the counting wheels with respect to one another is to be reduced by a factor of 2 in this case, that is to say typically 5:1 is to be selected. It is irrelevant here where and precisely how the symbols are provided. A toothed belt which is printed with symbols and which is coupled to the counting wheel meets this purpose as long as the symbols which can be read off appear with a 180° periods with respect to the rotating wheel and therefore permit unambiguous measurement with a 180°-period sensor.

According to one refinement of the devices described above, a transmission connects the wheels of the device with a rotational speed ratio of at least 2:1 such that over a plurality of full revolutions of the fastest wheel an unambiguous rotational angle can also be determined over a plurality of revolutions from measured values with 180° periods at at least one wheel of the devices.

For the measurement of angles over a range which goes far beyond 360°, that is to say a measurement of revolutions, transmissions with a high step-down ratio are helpful, in addition also multi-step transmissions. So that measurement of revolutions can be carried out on a wheel with a 180°-period sensor, the next wheel which is driven by this wheel must rotate at maximum at half the rotational speed. A significantly higher step-down transmission ratio is helpful in order to expand the counting range. Therefore, integral multiples of 2:1 are particularly useful.

According to one refinement of the devices described above, the device operates mechanically.

If the state of the device is changed by a mechanically operating transmission, it also operates without electrical energy, i.e. if the sensor system is not operating. This is helpful, on the one hand, in order to obtain (to store) the state of the device even over a long time period, and on the other hand also in order to be able to change the state even without electrical energy. This may be important in the case of heavy machines which e.g. continue to run on even after a power failure owing to their inertia.

According to one refinement of the devices described above, the state of the device can be read off even without electricity.

In particular, if the state of the device changes mechanically and is stored, it is helpful if the state can be read manually. Application examples are gas meters and water meters which normally do not require any electrical energy for their supply but should be able to be read off at any time. In this context, the manual reading off is possible by anyone even without a special piece of equipment, while the sensors are, under certain circumstances, read only by maintenance personnel.

According to one refinement of the device described above, said device has an at least partially transparent housing, the device being partially subjected to a medium, while other parts are protected from the medium by the housing.

If the mechanical counter is driven e.g. by water or gas, it is useful to keep electrical elements such as light sources and sensors separate from this medium. In the case of the present device this can be done by means of optical windows in a housing or by means of a housing which is transparent in its entirety. In addition to protection against corrosion, explosion protection is also an advantage here. Further mechanical couplings, for example magnetic couplings, between an impeller and the device are, of course, also conceivable, in order also to protect the transmission of the device with the wheels and pole filters from the medium.

Impeller wheel means here the wheel which has vanes, chambers or comparable features and which is driven by the medium.

According to one refinement of the devices described here, the sensor data of various wheels are correlated with one another.

In the case of multi-stage transmissions or at least two coupled wheels, it is advantageously possible to exploit the fact that the polarization measurement permits an absolute measurement of angles even if said measurement is at 180° periods. If two coupled wheels have a rotational speed ratio of N:1 but the angle measurement of the slower wheel is N-times more precise than that of the faster wheel, the position of the faster wheel can be unambiguously determined from that of the slower wheel, i.e. the measurement data are not independent of one another. The correlation of the measurement data of various wheels permits information to be acquired about mechanical play.

Even in the case of a less precise measurement on the slower wheel it is possible to specify an interval for the possible state of the faster wheel. Conversely, a set of possible states of the slower wheel is obtained for the state of the faster wheel. This information can be used to monitor the sensor signals mutually and acquire calibration data. This is helpful, under certain circumstances, in the case of slowly rotating and rarely read-out devices, since a mechanical movement to obtain calibration data is virtually impossible in the case of counters.

According to one refinement of the devices described above, the sensor data of at least one polarization sensor are determined with at least the resolution which is higher by the step-down ratio with respect to the preceding wheel as necessary with respect to the revolution measurement for the respective wheel, wherein means or mechanisms are present which are suitable, given failure of a sensor and/or a light source, for determining unambiguous information about the state of the device from the other sensor data.

As has been described above, the state of the relatively fast wheels can be unambiguously inferred, in particular, from the measurement data of the relatively slow wheels. Limits are placed on this by the mechanical play but also by the limited resolution and accuracy of the polarization measurement. Since the polarization measurement initially supplies analog signals, the digitization is relatively simple with higher resolution and accuracy than would be necessary mechanically for the position determination. In the case of a step-down ratio of N:1, the fast wheel must be determined to N positions. For the relatively slow wheel it is therefore sufficient to be able to determine more possible positions N times, in order to make the measurement on the relatively fast wheel superfluous. In this case, the measurement on the slower wheel supplies the information for the state of the faster wheel. This procedure is useful only to a limited degree over more than two stages, since the necessary measuring accuracy and the requirements made of the mechanics become very high. However, it is possible to reduce the number of transmission stages compared to encoder solutions by means of a high-resolution angle measurement and highly stepped-down rotational speeds between the wheels, since the additional expenditure for several bits more during the polarization measurement is relatively low.

According to one refinement of the device described above, adjustment errors of the pole filter and/or sensor can be measured in a mechanical reference position of the device by means of the sensors and can be stored in a non-volatile fashion as a reference signal.

In contrast to optical encoders, during the polarization measurement there are no particular adjustment requirements, i.e. the pole filters and sensors can be shifted as desired with respect to one another, and also the relative angle between the sensor and e.g. radius beam of the wheel to be measured can be freely selected. However, if the pole filter and sensor have a random orientation, this can be seen as an angle-shifted measurement signal. Such an angle error can easily be eliminated by forming differences, with the result that these angle errors can be determined for each sensor by reference measurement in a mechanical reference position. These angle errors can be stored in a non-volatile fashion and corrected with subsequent measurement with these data. This is advantageous not only in the case of the virtually unavoidable position inaccuracies which a sensor has with respect to its carrier (circuit board), but also the mounting of the carrier with accurate angles with respect to the rest of the devices is thus corrected. However, it is particularly advantageous that the relative angles between the pole filter and the wheel with respect to one another likewise has no effect on the adjustment of the pole filters on the wheels, merely mounting which is centered halfway about the rotational axis is advisable so that a relatively small pole filter ring can be used and a plurality of sensors can be mounted on radii which are more closely positioned one next to the other.

According to one refinement of the devices described above, the polarization sensor is an integrated circuit.

The measurement of the polarization information can advantageously be carried out by means of a relative measurement of various signals supplied by photodiodes with individually oriented pole filters. Four pole filters which are respectively rotated by 45° with respect to one another are particularly advantageously arranged above one separate photodetector in each case. In the case of irradiation with linearly polarized light, which rotates with respect to its polarization about the measuring axis, the photodetectors supply differential sine and cosine signals which can be evaluated very easily and with high accuracy. In this context, the intensity of the light beam and the degree of polarization does not play a significant role since only relative variables have to be evaluated. During the implementation as an integrated circuit, these different sensor fields can be accommodated in a very small space, in particular the accuracy of the angles of the integrated pole filters which are rotated with respect to one another being very high. The integrated circuit can perform additional functions, for example calibration, communication with other sensors etc. Other arrangements of integrated sensors and filters can likewise be used. In particular, monolithic integration in a standard process, for example a CMOS technology, is suitable for the integrated circuit, it being possible to achieve good results with feature sizes which are typical for 130 nm or smaller technologies, even in the visible range. With structures which are fabricated with 180 nm technologies, good results can be achieved at least in the infrared range.

According to an embodiment, the object is achieved by means of a device as has been defined above and which has a sensor range for polarization and a sensor range for brightness, arranged next to the sensor range for polarization, wherein the brightness determined in the polarization sensor is used as a reference signal for the evaluation of the brightness information of the brightness sensor.

The device describes a combined polarization and brightness sensor.

Relative signal strengths can equally well be used in classic optical encoders in which essentially only one binary decision light/dark has to be made. Here, the initially unknown brightness of the incident light or the detection of the failure of the light source is also an argument for a differential arrangement. However, in the case of the encoder, two signal tracks with inverse coding are required for this. If a polarization sensor is combined with an additional brightness sensor, this second digital track can be eliminated, since the sum of the signals measured by the polarization sensor is constant on average and (ignoring filter losses) corresponds approximately to half the brightness of the non-polarized light. Therefore, differential information can already be acquired from the comparison of the information acquired on the additional brightness-modulated track with the brightness determined in the polarization sensor.

According to an embodiment, the use is achieved by means of a device as defined above for polarization measurement, a plurality of sensor ranges between arranged in such a way that signals from a plurality of independent signal sources can be measured.

The device describes a multi-channel sensor for measuring polarization.

Whereas in the case of optical encoders the number of signal tracks is high and very stringent requirements are made of the adjustment, the measurement of polarization takes place in the simplest case only with one track and, if appropriate, an auxiliary track for the extension to 360°. Therefore, the polarization sensor can be made much smaller than an encoder sensor. This saving in area can be used as a cost advantage for the individual sensor. However, there is a further potential saving if the sensor area which is freed up is used for further sensor tracks with which either the same signal can be measured redundantly or else, in particular in the case of use with counters or multi-term encoders, is used for multi-channel measurement of the angle of various wheels. Since rotation speeds of the wheels to be measured are very low in many applications, a common use of electronic components (e.g. analog/digital converters) can also advantageously occur here.

According to an embodiment, the object is achieved by means of a device as defined above which has at least one sensor range for polarization and at least one sensor range for brightness arranged next to the latter, wherein the brightness determined by a polarization sensor is used as a reference signal for the evaluation of a brightness information item, wherein the sensor ranges are arranged in such a way that signals from a plurality of independent signal sources can be measured.

The device describes a multi-channel sensor having at least one sensor arranged for polarization and at least one sensor range for brightness arranged next to the latter, wherein the brightness determined by a polarization sensor is used as a reference signal for the evaluation of brightness information, wherein the sensor ranges are arranged in such a way that signals from a plurality of independent signal sources can be measured.

The device describes a multi-channel sensor having at least one sensor range for polarization and at least one sensor range for brightness arranged next to the latter. It is possible for the sensors which are used to measure the polarization also to be employed for measuring brightness. Additional sensors can also be accommodated in the sensor range for the polarization sensor. However, without spatial separation it is difficult to measure brightness information and polarization information without reciprocal effects. If an additional signal track is mounted as a bright/dark marking next to the pole filter on one wheel, both signals will expediently be measured with sensor ranges located one next to the other.

According to an embodiment, the object is achieved by means of a device as defined above, having at least one sensor for polarization and one sensor for color on a commonly used sensor area.

The device describes a combined polarization and color sensor. In contrast to strong intensity modulation, which could adversely affect the measurement of the polarization, color can also be used for the 360° extension of the measuring range. Such a device can also be accommodated in the region of the polarization sensor system and then does not require any additional area on the wheel to be measured. Wavelength-dependent sensors can be implemented e.g. by means of various low semiconductor zones or optical resonators or color filters over the photodetectors. In some embodiments, either wavelengths are used which do not have any effect on the measurement of polarization (because they are either not polarized or are polarized to the same extent or the polarization sensors do not detect this wavelength at all), or measurement is carried out in the time-division multiplex mode, sometimes polarization information and sometimes color information.

A wavelength measurement can also be carried out without an additional sensor area by virtue of the fact that a plurality of photodetectors are arranged one behind the other in the direction of incidence of the light under the fixed polarization filters. This functions since the penetration depth of light into e.g. silicon is wavelength-dependent. The sensor can advantageously be operated with two wavelengths for which a similarly strong polarization signal is obtained. This can also be influenced by suitable brightness levels at the respective wavelengths or differing degrees of optical damping of the colors in the color coding which is superimposed on the rotatable pole filter. The greater the difference between the wavelengths, the greater the shifting of the signal current between stacked photodetectors, which can be composed e.g. of diffusion zones, on the one hand, and implanted zones, on the other. This arrangement is more efficient in terms of area than e.g. the use of separate sensors with separate color filters, wherein such arrangements are also within the sense of the disclosure. Additional stacked photodiodes without a fixed pole filter located above them in the direct vicinity of the polarization sensors also perform the same purpose equally.

According to one refinement of the devices described above, the energy which is necessary for the measurement is transmitted in a wireless fashion to the device.

If mechanical counters are used whose state is interrogated only rarely, permanent supply of electrical energy is not necessary. Operation by battery or the use of energy harvesting is not unconditionally appropriate, for example in the case of gas meters and water meters. If a counter reading is determined only sporadically but nevertheless is to be acquired electronically, a brief supply can also be provided for this moment, wherein it is possible to dispense with plug-type connections which are susceptible for faults, and the energy can, for example, be transmitted by induction coils or by means of a combination of a light source and solar cell.

According to one refinement of the devices described above, the measured signals are transmitted in a wireless fashion by the device.

If the electronic acquisition of counter readings serves essentially for the purpose of greater speed and for avoiding faults compared to manual reading off, a transmission of the measurement data by radio or modulated light is appropriate. In particular, a radio transmission can also be carried out over a relatively large distance, that is to say by telemetry. This eliminates the need to have to visually inspect the counter to be read.

The defined devices, in particular the devices according to various embodiments, can advantageously be used for determining rotational angles and/or revolutions.

An embodiment provides a device having more than one rotatable wheel, at least one light source and more than one polarization sensor, the wheels being at least partially transparent and polarization-maintaining, parts of the wheels being configured as pole filters, the wheels at least partially overlapping, it being possible for light which exits the light source to be polarized by the pole filters of the wheels and to be received by the polarization sensors, it being possible for the light to penetrate a plurality of wheels, and the light which is received by a polarization sensor being polarized by just one of the pole filters.

In various embodiments, additional coding elements on at least one wheel and sensors which match them and generate an unambiguous measuring range over 360° are provided.

An embodiment provides a device having more than one rotatable wheel and in each case having measuring wheels which are connected thereto mechanically by means of a ratio of at least 2:1, at least one light source and more than one polarization sensor, the measuring wheels being at least partially transparent and polarization-maintaining, parts of the measuring wheels being configured as pole filters, the measuring wheels at least partially overlapping, it being possible for light which exits the light source to be polarized by the pole filters of the measuring wheels and received by the polarization sensors, it being possible for the light to penetrate a plurality of measuring wheels, and the light which is received by a polarization sensor being polarized by just one of the pole filters.

In various embodiments, the light which is polarized by a plurality of wheels can be measured at various locations.

In various embodiments, symbols are provided at 180° periods on the circumference of a wheel.

In various embodiments, a transmission connects the wheels of the device with a rotational speed ratio of at least 2:1 such that over a plurality of full revolutions of the fastest wheel an unambiguous rotational angle can also be determined over a plurality of revolutions from measured values with 180° periods at wheels of the device.

In various embodiments, the device operates mechanically.

In various embodiments, the state of the device can be read off even without electricity.

In various embodiments, the device can further include an at least partially transparent housing, wherein the device is partially subjected to a medium, while other parts are protected from the medium by the housing.

In various embodiments, the sensor data of various wheels are correlated with one another.

In various embodiments, the sensor data of at least one polarization sensor are determined with at least the resolution which is higher by the step-down ratio with respect to the preceding wheel as necessary with respect to the revolution measurement for the respective wheel, having mechanisms which are suitable, given failure of a sensor and/or a light source, for determining unambiguous information about the state of the device from the other sensor data.

In various embodiments, adjustment errors of the pole filter and/or sensor can be measured in a mechanical reference position of the device by means of the sensors and can be stored in a non-volatile fashion as a reference signal.

In various embodiments, the polarization sensor is an integrated circuit.

In various embodiments, the device can further include a sensor range for polarization and a sensor range for brightness, arranged next to the sensor range for polarization, wherein the brightness determined in the polarization sensor is used as a reference signal for the evaluation of the brightness information of the brightness sensor.

In various embodiments, the device can further include at least two ranges for polarization measurement, a plurality of sensor ranges being arranged in such a way that signals from a plurality of independent signal sources can be measured.

In various embodiments, the device can further include at least one sensor range for polarization and at least one sensor range for brightness arranged next to the latter, wherein the brightness determined by a polarization sensor is used as a reference signal for the evaluation of a brightness information item, wherein the sensor ranges are arranged in such a way that signals from a plurality of independent signal sources can be measured.

In various embodiments, the device can further include at least one sensor for polarization and one sensor for color on a commonly used sensor area.

In various embodiments, the energy which is necessary for the measurement is transmitted in a wireless fashion to the device.

In various embodiments, the measured signals are transmitted in a wireless fashion by the device.

Various embodiments provide for measuring rotational angles and/or revolutions with the disclosed device.

BRIEF DESCRIPTION OF THE DRAWINGS

Various embodiments are explained in more detail below, for which purpose reference is made to the appended drawings. The figures are as follows:

FIG. 3a shows a simplified illustration of a manually readable device for counting with coaxial wheels, equipped with polarization filters and a double symbol sequence on the circumference;

FIG. 3b shows a plan view of one of the counting wheels 301 with a pole filter ring 302 and a drilled hole 300;

FIG. 3c shows an advantageous way of obtaining pole filter rings 302a-d with different radii, e.g. by punching out from a pole filter foil 310;

DETAILED DESCRIPTION

The young class of polarization rotational angle sensors according to DE102005063524 and DE102005031966 permits absolute rotational angles to be measured insensitively with respect to adjustment and from a large distance, since, in contrast to optical encoders, the rotational angle can be measured equally at any location on the rotating polarization disk and does not depend on spatial encoding. Therefore, the polarization measurement permits an absolute angle to be determined with just one (analog) track instead of a multi-track (digital) code disk. In addition, depending on the environmental conditions the rotary encoders can also be obtained from economical plastic films, in particular cut to size or punched out. The 180° periodicity of the polarization measurement must, however, be taken into account.

Figure 1:
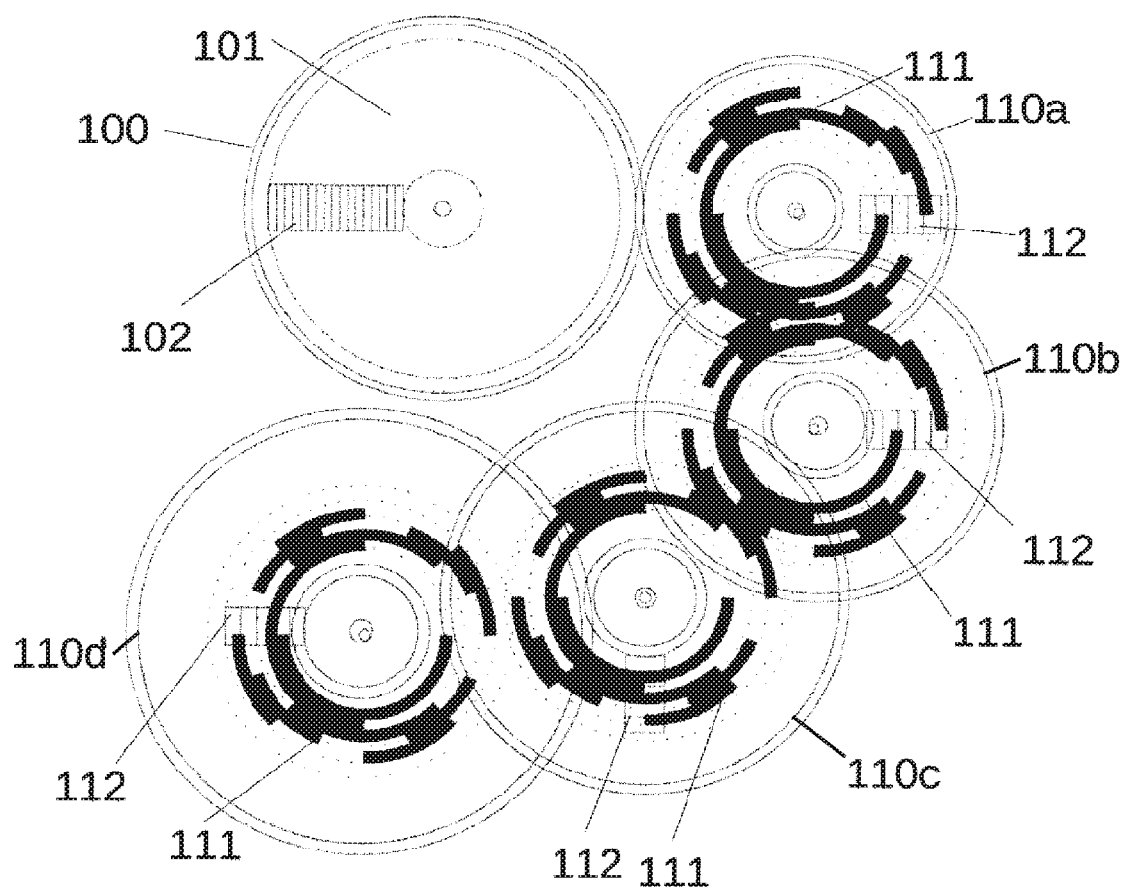
FIG. 1 shows a simplified illustration of a counter for multi-turn rotary encoders with code disks, 4-stage transmission with 8:1 step-down ratios and 5-track code disks (prior art)

FIG. 1 shows symbolically a multi-turn rotary encoder according to the prior art. The driven main gear 100 is embodied as a spur gear and is provided with a high-resolution code disk 101 by a suitable sensor array 102 (composed of a collimator light source, sensor and evaluation). Via the toothing arrangement of the main gear, further gearwheels 110 are driven which have a step-down ratio in relation to the respective previous wheel, that is to say rotate more slowly incrementally. In turn, code disks 111 are provided on these gearwheels 110 and are read out with sensor arrays 112. The requirements made of code disks 111 and sensor arrays 112 are smaller here than in the case of the main gear, which is caused by the limited mechanical step-down ratios, on the one hand, and the costs of the sensor system, on the other. We will assume that a step-down ratio 8:1 is present from one wheel to the next and the transmission has 4 gearwheels apart from the main gearwheel. The single counting region for revolutions of the main gear 100 is in this case 8^4=4096 or 12 bits. For each gearwheel 110 a counting range of 0 ... 7 must be covered in this case, with the result that practically 4 or even 5 bit resolution has to be sensed wheel. Overall, according to the prior art 4 further code disks each with 4 sensors and 4 collimated light sources must therefore be aligned precisely with respect to one another (16 light barriers). The sensor arrays 112 are to be arranged here in such a way that they only pick up signals of one gearwheel 110 in each case. In addition, it has to be ensured that the small working distance is maintained. Under certain circumstances, the sensors are therefore not arranged in a plane. If each track of a code disk 101 is only 1 mm wide, the code disk must comprise a radius region of at least 4 mm. The illuminated region must be correspondingly large, as must the respective sensor array.

Figure 2:
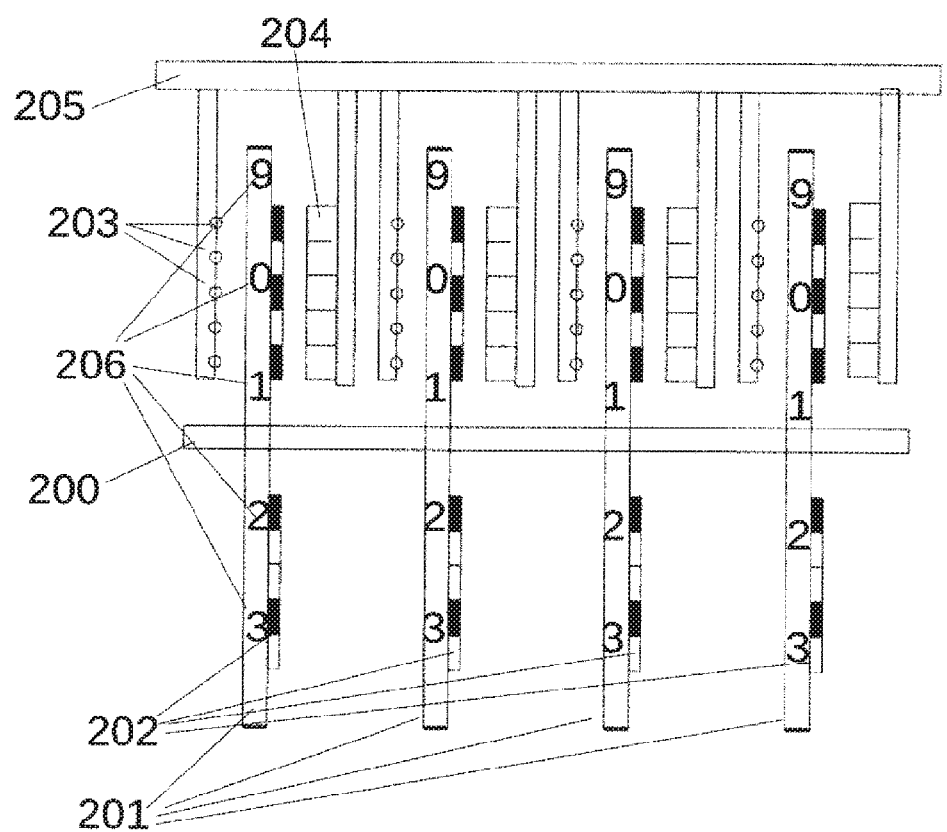
FIG. 2 shows a simplified illustration of a device which can be manually, for counting with coaxial wheels (e.g. for gas meters), for example for counting range 0000 . . . 9999 (prior art)

FIG. 2 shows the schematic design of an electronically readable counter with 4 number gears 201 (counting range 0 ... 9999) on a common shaft 200 as well as code disks 202 and optical absolute value encoders composed of collimated light sources 203 and a sensor array 204 for each number gear, wherein the sensor system must be held in position by the carrier 205. The mechanical (stepping) gear mechanism is not shown. In order to unambiguously assign the symbols 206 (e.g. numbers 0 ... 9) which are provided uniformly on the circumference, an angular resolution of 4 to 5 bits over 360° is also necessary here, i.e. the considerations for the width of the code disk and size of the sensor arrays etc. remain initially the same. Since in the case of the counter a multiplicity of wheels are arranged one behind the other on a common rotational axis, the mounting of the light barriers is even more complex than in the case of the multi-turn encoder. The design would be simplified if the collimated light sources 203 and sensor arrays 204 could be collected on both sides of the gear mechanism 202. However, the necessary width of the code disks 202 is unfortunately so large that the radius of the disks would have to be significantly larger. In order to be able to illuminate approximately 3 wheels at once, one of them would have to have the code near to the axis, one in a central position and one would have to have the code near to the circumference, i.e. each wheel would need a complex code disk with a different parameter. In particular, a collimated light beam would have to be generated over almost the entire radius of the wheels, which can be implemented e.g. by means of an array of light-emitting diodes, lenses and shutters (one each per data track).

In addition, it is probable that each individual data track has to be made wider as a result of the relatively large working distance, in order to be able to reliably read the code. The possible reduction of hardware and costs is therefore limited.

In contrast, combining a plurality of codes on the same radius is possible only with very high expenditure, for example by means of color coding which absorbs in a narrow band and multi-colored or white light sources. The evaluation of a plurality of wheels one behind the other is virtually impossible magnetically, since the magnetic fields are superimposed on one another and are virtually impossible to measure over a large distance.

According to some embodiments, a relatively simple design of the device is obtained by using polarization filters and polarization sensors as shown in FIG. 3a. Instead of the multi-bit code disks, rings 302 made of polarizing material are used. The greater part of each wheel 301 remains transparent, in particular polarization-maintaining. If the wheels are arranged coaxially, each wheel will expediently have a pole filter ring on another radius (302a ... d). Corresponding disks can be punched particularly economically from a single pole filter foil (FIG. 3c).

Since the polarization measurement permits an analog measurement of absolute angles, the precise measurement of absolute angles is already possible with an e.g. 1 mm-wide strip. The differentiation of the ambiguity (polarization with 180° periods) can be carried out either by means of auxiliary signals, e.g. superimposed coding (transparency, color, optical elements which offset the optical axis) or at least one additional binary track (as a result of which e.g. a total of 2 mm radius range will be required per wheel). Therefore, the angles of 2 or even 4 wheels could be measured on the radius range which a single wheel for a 4-bit encoder requires according to the prior art.

An even greater simplification is obtained if the gear mechanism is adapted to the 180° periodicity of the polarization measurement. In the case of manually readable devices, for this purpose the symbol sequence (for example numbers 0 ... 9 can be printed twice one behind the other on the circumference, as indicated in FIG. 3a. The step-down gear mechanism between the gearwheels should not be stepped down by more than 10:1, but rather by 5:1. That is to say even after half a revolution of the n-th wheel, the n+1 wheel rotates one symbol further, but with a ratio to a conventional 360°-period-labeled wheel of only half the angle.

Figure 4:
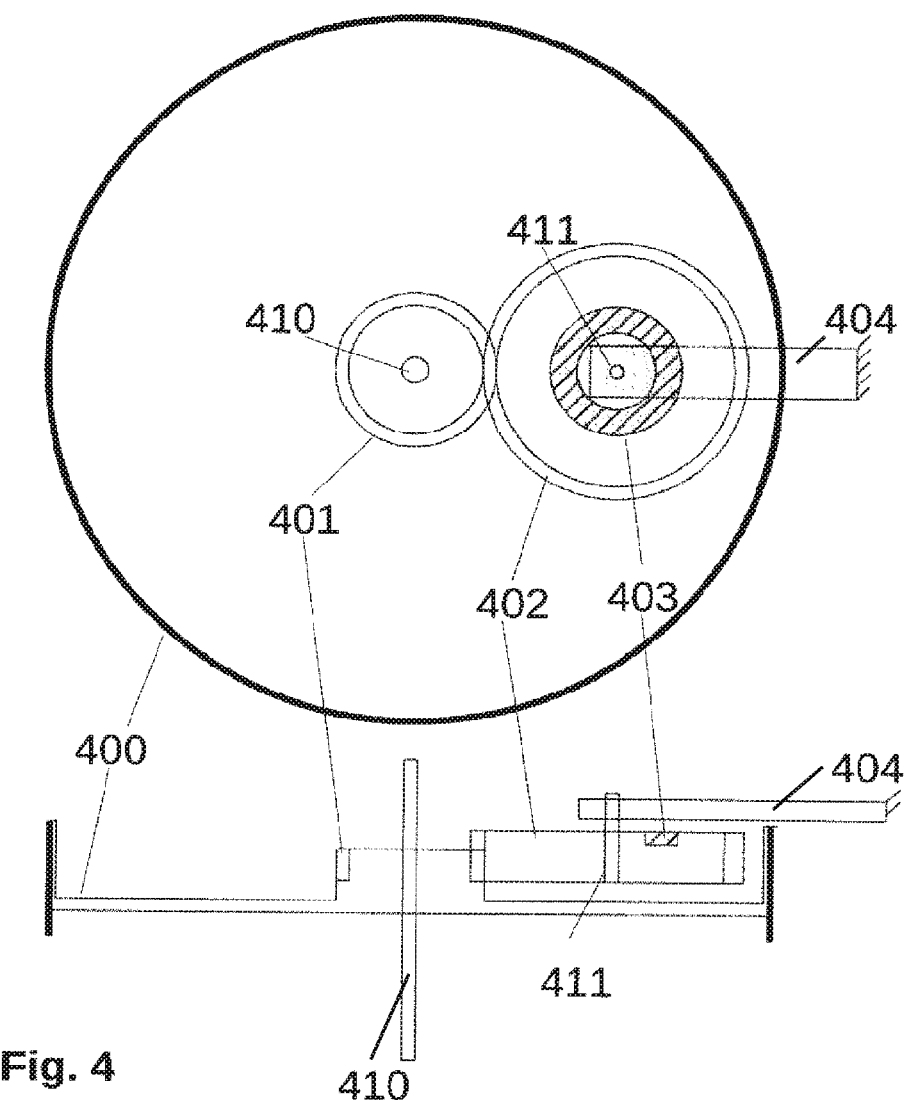
FIG. 4 shows a unit of a counter with additional 2:1-stepped-down gearwheel. The revolution of the gearwheel can occur unambiguously by measurement of the polarization, since the pole filter makes only a half revolution when the counting wheel makes a full revolution

Alternatively, conventional counting wheels are used and additional gearwheels are provided for each counting wheel which make only half a revolution for each full revolution of a counting wheel and therefore also permit an unambiguous measurement with a 180°-period sensor. FIG. 4 shows for example such an arrangement in which the counting wheel 400 has (driven with a counting mechanism which is not shown) an internal toothing 401 on a rotational axis 410, and drives a gearwheel 402 with a double tooth number and on which a pole filter ring 403 is provided. A mechanical securing means 404 ensures the position of the gearwheel 402 on a separate short rotational axis 411. As in FIG. 3a, pole filter rings of different radii for the various counting wheels are used, wherein by suitable selection of various rotational sensors for different gearwheels 402 it is also possible to use the same pole filter radii multiply, which permits particularly compact arrangements.

Figure 5:
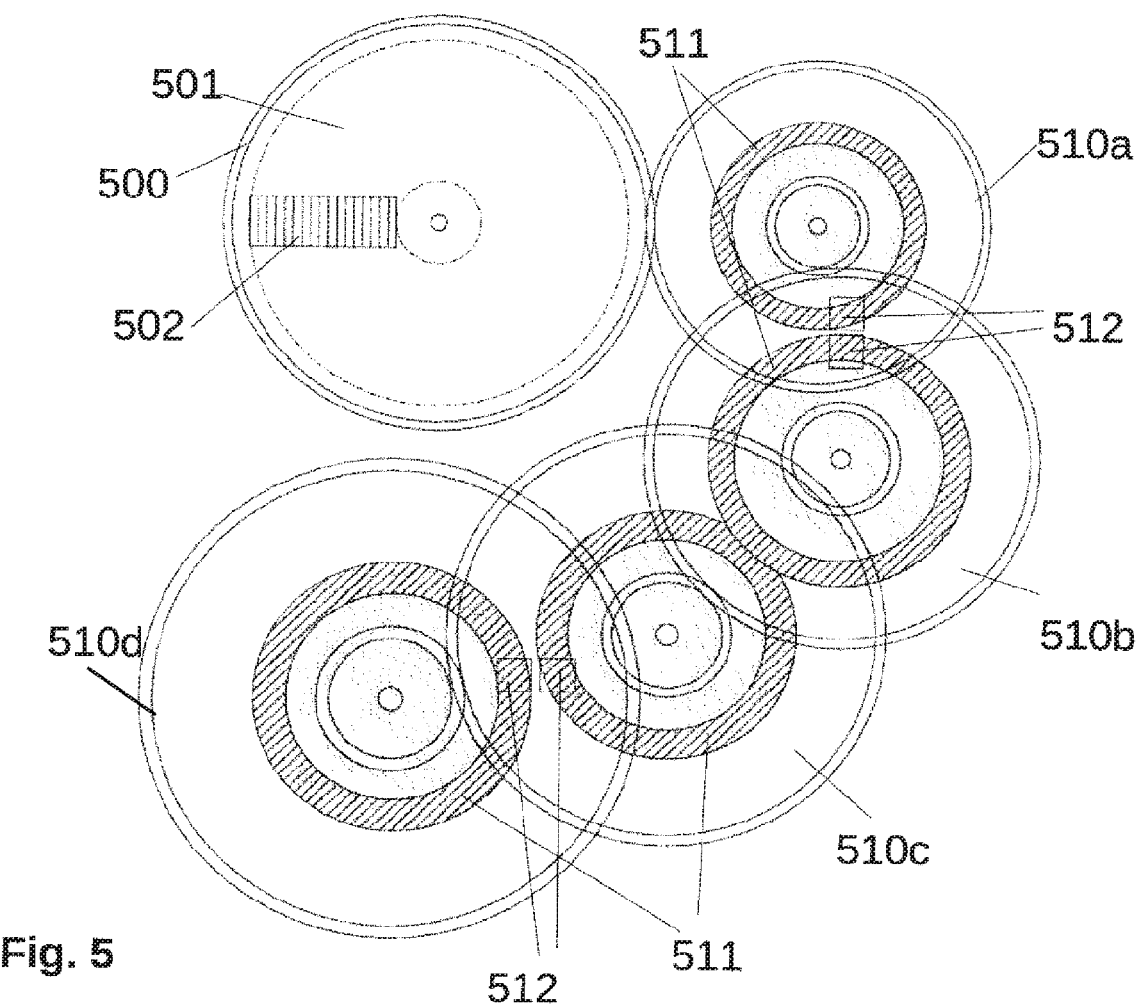
FIG. 5 shows a simplified illustration of a counter for a multi-turn rotary encoder using polarization sensors.

The transmissions of multi-turn rotary encoders can also be configured correspondingly. Measurements can also be carried out here in the overlapping region of the gearwheels, since the space which is taken up by the respective pole filter ring is smaller than in the case of encoder disks. Therefore, multi-channel polarization sensors can also be used which at the same time sense the angle of a plurality of gearwheels. FIG. 5 shows this in a version without an additional binary track for 360°, i.e. only with pole filter rings.

Repetition of the measurement signal every 180° can be taken up by the respectively following transmission stage, the unambiguous counting range of which is accordingly halved with respect to the transmission step-down ratio. So that this functions, the transmission step-down ratio must be at least 2:1, i.e. after one full revolution of the first wheel the second can have rotated a half revolution at maximum. Significantly higher step-down ratios, in particular multiples of 2:1 are useful so that a plurality of bits of counting range are obtained per wheel without the requirements which are made of the absolute angular accuracy of a sensor becoming too large to be able to supply correct signals over the entire service life of the counter without calibration. Compared to optical encoders, firstly one bit is therefore lost by the 180° periodicity, but a significantly higher resolution, e.g. per 8 bits instead of the 4 or 5 bits shown in FIGS. 1 and 2, is obtained as a result of the measurement of absolute angles but in the same or a smaller space.

Alternatively, the rotating pole filters can also be driven here again by means of separate 2:1 step-down ratios, with the result that the design of the actual counting mechanism does not change with respect to classic designs for 360°-period sensors.

Figure 7A:
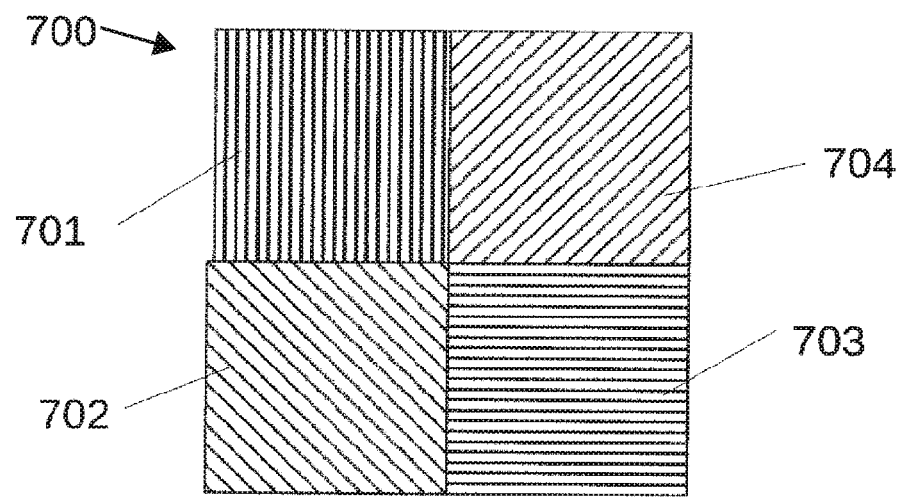
FIG. 7a shows a simplified illustration of a polarization sensor in a plan view.

The polarization sensor is advantageously embodied as an integrated polarization sensor. Its advantages are not only the miniaturization and the inherently good angular accuracy of the integrated pole filters but also the simple integration of further functions for digitization, error correction and communication with other sensors. In addition, the polarization measurement in a very small space permits an adjustment tolerance with respect to the rotatable polarization filter ring. In this context, arrangements with four integrated pole filters which are each rotated through 45° are particularly advantageous, as shown in FIG. 7a.

For devices in which numbers (usually 0 . . . 9) which can be read on the circumference are arranged, the requirement which is made of the resolution and accuracy are extremely small, but the number of wheels which have to be interrogated is often higher (e.g. 8 to 12). Since in any case a certain minimum radius is necessary to accommodate readable numbers, here multi-track illumination is easily possible. As a result of skillful arrangement of light source and sensors, the number of required light-emitting diodes and sensors can be minimized further. With four LEDs and four 2-channel polarization sensors it is already possible to read 8 wheels easily, wherein all the sensors can be accommodated on a common circuit board and only the distance from the rotational axis is relevant as an adjustment parameter (FIG. 3). The non-ambiguity over 360° can again here also be generated by means of additional tracks, superimposed coding or 180°-periodic labeling and adaptation of the transmission. When flat chip housings are used, which can be mounted countersunk in recesses in a carrier circuit board, an overall thickness of the circuit board of less than 1 mm is possible despite signal reception on both sides, with the result that very compact counting mechanisms can be implemented with little expenditure.

Figure 6A:
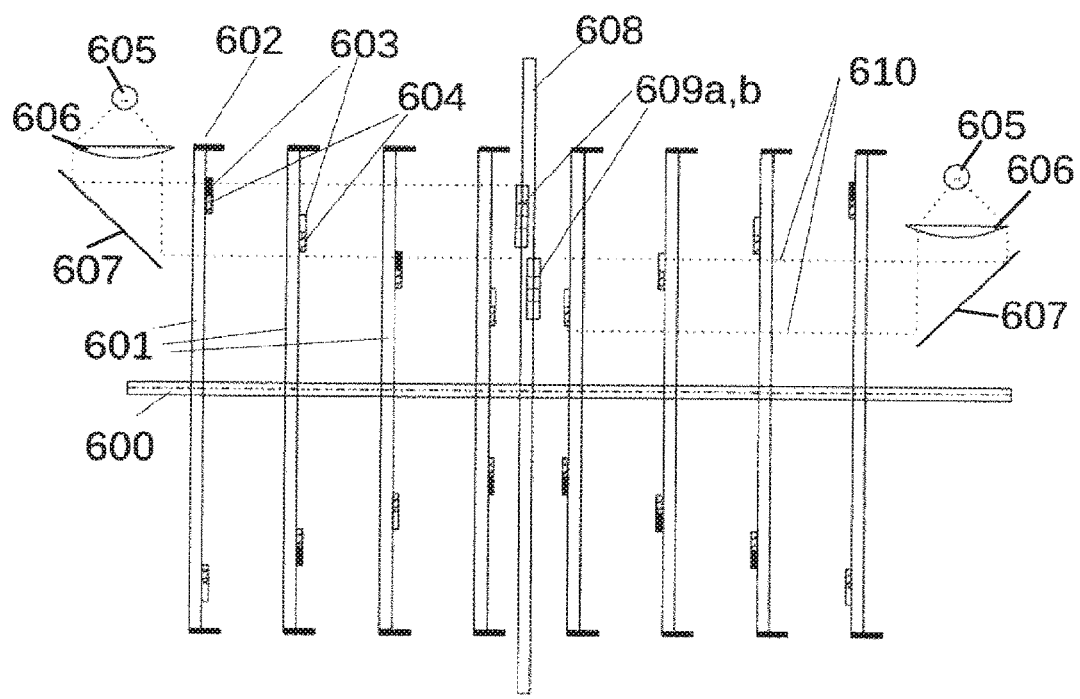
FIG. 6a shows a simplified illustration of a manually readable device for counting with 8 coaxial wheels (counting range 00000000 . . . 99999999), equipped with polarization filters and an additional binary auxiliary track, and only a simple signal sequence on the circumference for it.
Figure 6B:
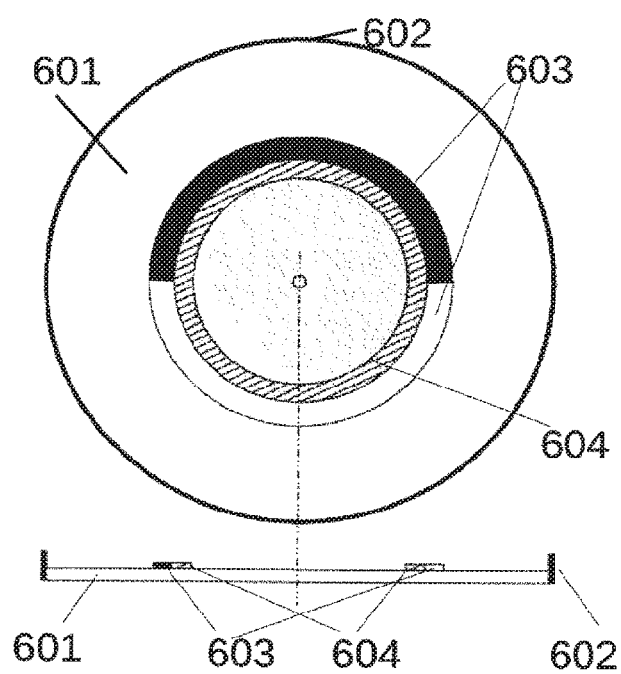
FIG. 6b shows a plan view of one of the counting wheels.
Figure 6C:
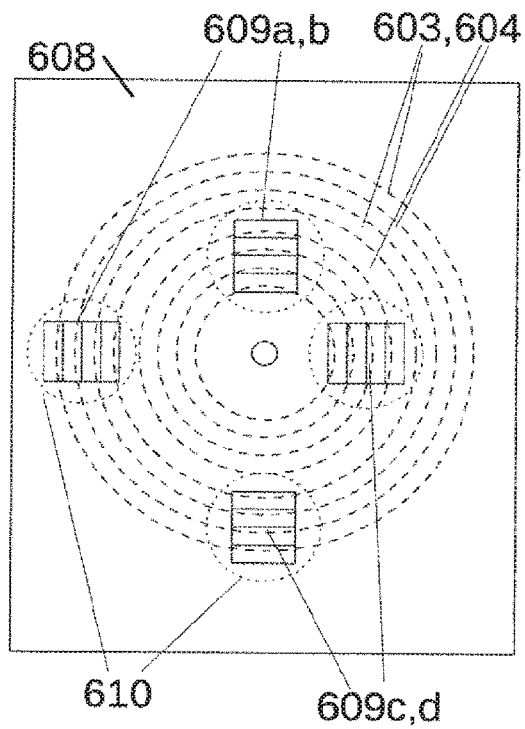
FIG. 6c shows a possible arrangement of sensor arrays 609 on the mount 608 for measuring the signals with a multiplicity of tracks for polarization measurement and brightness measurement (603,604) with unambiguous illumination 610.

If the number of the counting wheels is higher (e.g. >8), not only the distance between the light source and the sensor increases but also the number of optical interfaces (alternately air and plastic or glass). In this way, on the one hand light is lost through reflection and on the other hand incorrect sensor measurements can be obtained in the form of scattered light. Scattered light can be kept away from the sensors by suitable shutters. Multiple reflections between the light source and pole filter are comparatively uncritical. Reflections between the pole filter and sensor can, however, have a destructive influence on the measurement result. Even if the typical counting range of 0 . . . 9 does not make particularly stringent requirements, it is, under certain circumstances, helpful to reduce the number of interfaces to be overcome between the light source and the sensor. FIG. 6 shows by way of example how a high number of counting wheels can be sensed with low electronic expenditure. For the sake of completeness here the case is shown which, instead of using additional gearwheels for the 360° non-ambiguity as in FIG. 4, an additional binary track is used. In this case, the polarization sensor must also evaluate a brightness signal at a suitable distance. In this context, it is possible to dispense with differential tracks because the polarization sensor registers approximately half the intensity of the brightness signal if, for example, an unpolarized LED is used for the illumination. The comparison of the binary track with that of the signal detected by the polarization sensor therefore already provides relative information which can be evaluated with a high degree of certainty irrespective of the light intensity.

Sensors which are located one next to the other can also be implemented by means of a multi-channel sensor. In order to obtain a saving in terms of LEDs, in FIG. 6 the beam of one LED is used for two sensor groups in each case. The sensor groups are each combined to form a 2-channel sensor which is arranged in the center of the arrangement on a common circuit board with other sensor groups in such a way that signals of 8 counting wheels are detected. By means of a suitable selection of the sensor housings (e.g. flat packs which are countersunk in recesses in the circuit board), the circuit board together with the mounted components can be very thin (<1.5 mm). By e.g. milling the circuit board in the region of the counting wheel outer ring it is possible to reduce the required distance between them even further, since only low requirements are made of the mechanical rigidity. In order to reduce the lateral installation space, a deflection of the light beam may be useful. The light which exits the light source (LED) 605 after passing through a lens 606 can thus be deflected using a mirror or prism 607. When partial mirroring is used for 607 it is also possible to supply a further region with a second mirror behind it with light, with the result that the number of light sources can be reduced further.

It is comparatively simple to convert the analog sensor signals of the polarization sensor into a high-resolution angle (to digitize said signals). Therefore, e.g. 10-bit digitization is also possible with low additional expenditure even if only 5 bits are required owing to the design. The additional information which is produced in this way can be used e.g. to monitor the signals from various sensors with respect to one another and obtain calibration data or correction data. However, the high-resolution measurement also provides, in particular, the possibility that the device can continue to be read without a loss of information even in the case of a defective sensor or a defective light source if the resolution is more than twice as high in bits than is necessary according to the transmission step-down ratio (e.g. 10 bits instead of 5 bits). This is virtually impossible in customary devices or multi-turn rotary encoders with digital encoder disks because each further bit requires considerable additional expenditure.

It is also interesting with the device described here that the counting mechanisms can operate purely mechanically, i.e. without a power supply, without the risk of loss of a count reading. This is important e.g. in the case of heavy machines which in the case of an electrical fault run on in an uncontrolled fashion or are moved during maintenance, or if machines have to be capable of being operated further under adverse conditions, even if electrical functions fail.

As a result of the significant reduced expenditure, it is additionally attractive also to equip multi-step sensors with manually readable code disks in order to be able to read them even without electronic aids, even in the switched-off state, or to equip previously purely mechanical counting mechanisms with an additional sensor system in order to improve the comfort or efficiency. Meters for current, gas and water are examples of this, but this is also an economical extension of the previous functionality in the case of Bowden cable position sensors or multi-turn rotary encoders for spindle drives.

The figures each show only the basis of a possible implementation of devices or multi-turn rotary encoders with polarization measurement without illustration of mechanical details. A multiplicity of variations are conceivable and can easily be implemented by a person skilled in the art.

Depending on the requirements in terms of resolution and accuracy, any desired sensor system can be used on the main wheel. In particular, instead of a high-resolution optical encoder it is also possible to use a polarization sensor or even a magnetic sensor.

The use of a transmitted light sensor system for the polarization measurement is advantageous but not compulsory. A reflective sensor system can also be used behind the pole filters by means of reflectors.

Figure 7B:
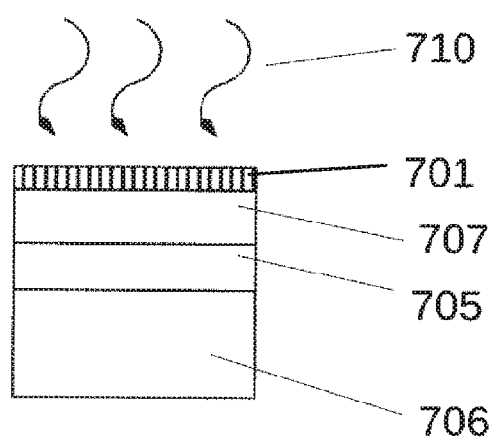
FIG. 7b shows a possible cross section through a sensor element of a combined polarization-sensitive and color-sensitive sensor.

If recourse is made to additional color coding for the 360° extension of the polarization measurement, there are various ways of integrating the color measurement in the polarization measurement in order to obtain a saving in sensor area and therefore connect the color coding also to the polarization measurement. In addition to color filters over a photodetector, implemented e.g. by color filters or optical resonators, it is possible to form a relationship between photocurrents of photodetectors which are at different depths in a semiconductor. Since the penetration depth of shortwave light is very much smaller than that of infrared light, e.g. a detector stack can be implemented from a diffused detector and an implanted detector in customary semiconductor technologies without a large amount of expenditure. Corresponding sensors are used individually for camera applications. Such a sensor stack could measure the color information on a separate signal track on the wheel. However, it is more favorable in terms of area to superimpose color information and polarization information, during which superimposition only one of two colors arrives at the sensor, for example, per semicircle, and said sensor carries out both measurements in the same space. This can be carried out by means of closely adjacent sensors for the polarization and color, but also by means of a color-sensitive sensor stack which is covered by a fixed pole filter. FIG. 7b shows this in cross section by means of such an arrangement.

To summarize, the advantages of the use of the polarization measurement can include:

freely selectable radius of the polarization rings measurement of angles can take place at any location on the polarization ring and the sensor can also be mounted in a rotated position (e.g. electronic (digital) correction of the mounting angle)

reduced radius region by a measurement of absolute angles as a result smaller wheels are possible measuring capability over a large distance permits the measurement on wheels which are located one behind the other as a result it is possible to measure the rotational angle of a plurality of wheels with a sensor array the resolution of the polarization measurement depends only on the signal processing and can be significantly larger than in the case of optical encoders.

The disadvantage of the 180° periodicity can optionally be avoided with an auxiliary signal, e.g. an additional digital track or information which is superimposed on the polarization, or else can be dealt with by means of the configuration of the transmission (for example by means of auxiliary gearwheels with 2:1 step-down ratio or by reducing the counting range of the subsequent transmission stage).

REFERENCE NUMBERS 100 externally driven main gear for the rotational angle detection within one revolution
101 broad radius range with high-resolution code disk (not shown in detail)
102 sensor array for sensing the high-resolution code disk (e.g. 16 bit)
110a-d transmission gearwheels for multi-turn measurement
111 code disk for the measurement of angles on transmission gearwheels (5 bits here)
112 sensor array for sensing a code disk 111,
200 common shaft
201 counting wheel with symbol labeling on circumference
202 code disk for optical encoder, with 5 bits here
203 array of collimated light sources (e.g. LED with lens and shutter)
204 sensor array for sensing a code disk
205 mechanical mount
206 symbols on the circumference of a counting gear (e.g. numbers 0 . . . 9)
300 common shaft
301a-d counting wheel with double symbol labeling on circumference
302a-d pole filter rings with different radii 303 array of collimated light sources (e.g. LED with lens and shutter)
304 array of polarization sensors
305 mechanical mount
306 symbols on the circumference of the gearwheel (e.g. numbers 0 . . . 9, 0 . . . 9)
400 counting wheel
401 internal spur gear toothing arrangement
402 additional gearwheel with double the number of teeth
403 pole filter ring on the gearwheel
404 mechanical mount
410 shaft
411 short shaft for the additional gearwheel
500 externally driven main gear for the detection of rotational angles within one revolution
501 broad radius range with high-resolution code disk (not shown in detail)
502 sensor array for sensing the high-resolution code disk (e.g. 16 bit)
510a-d transmission gearwheels for multi-turn measurement
511 pole filter ring for the measurement of angles on transmission gearwheels
512 sensors for measuring polarization behind 511
600 common shaft
601 counting wheel with normal symbol label on circumference
602 symbols on the circumference of the counting wheel (e.g. numbers 0 . . . 9)
603 binary auxiliary tracks (transparent/black) for an unambiguous measurement over 360°
604 pole filter rings with different radii
605 light sources, e.g. LED
606 collimator (lens)
607 mirror or prism
608 mechanical mount for sensors, here one sensor array on the front side and one on the rear side of the mount
609 array of polarization sensors and brightness sensors for auxiliary tracks
610 range of illumination
700 a plan view of a field with 4 sensors, each with different orientation of the fixed polarization filters which are associated with the respective sensor element
701-704 shows differently oriented fixed pole filters
705 shows a photodetector near to the surface, under a fixed pole filter 701 (in silicon for short wavelengths of visible light)
706 low photodetector under a fixed pole filter 701 and detector 705 (in silicon for long wavelengths of visible light and near IR)
707 transparent region, e.g. glass
710 incident polarized light

The invention claimed is:
1. A device comprising:
multiple rotatable wheels,
at least one light source, and
more than one polarization sensor,
the wheels being at least partially transparent and polarization-maintaining, parts of the wheels being configured as pole filters, the wheels at least partially overlapping, it being possible for light which exits the light source to be polarized by the pole filters of the wheels and to be received by the polarization sensors, it being possible for the light to penetrate a plurality of wheels, and the light which is received by a polarization sensor being polarized by just one of the pole filters.

2. The device as claimed in claim 1, further comprising additional coding elements on at least one wheel and sensors which match them and generate an unambiguous measuring range over 360°.

3. The device as claimed in claim 1, wherein the light which is polarized by a plurality of wheels can be measured at various locations.

4. The device as claimed in claim 1, wherein symbols are provided at 180° periods on the circumference of a wheel.

5. The device as claimed in claim 1, wherein a transmission connects the wheels of the device with a rotational speed ratio of at least 2:1 such that over a plurality of full revolutions of the fastest wheel an unambiguous rotational angle can also be determined over a plurality of revolutions from measured values with 180° periods at wheels of the device.

6. The device as claimed in claim 1, wherein the device operates mechanically.

7. The device as claimed in claim 1, wherein the state of the device can be read off even without electricity.

8. The device as claimed in claim 1, further comprising an at least partially transparent housing, wherein the device is partially subjected to a medium, while other parts are protected from the medium by the housing.

9. The device as claimed in claim 1, wherein the sensor data of various wheels are correlated with one another.

10. The device as claimed in claim 1, wherein the sensor data of at least one polarization sensor are determined with at least the resolution which is higher by the step-down ratio with respect to the preceding wheel as necessary with respect to the revolution measurement for the respective wheel, having mechanisms which are suitable, given failure of a sensor and/or a light source, for determining unambiguous information about the state of the device from the other sensor data.

11. The device as claimed in claim 1, wherein adjustment errors of the pole filter and/or sensor can be measured in a mechanical reference position of the device by the sensors and can be stored in a non-volatile fashion as a reference signal.

12. The device as claimed in claim 1, wherein the polarization sensor is an integrated circuit.

13. The device as claimed in claim 1, further comprising a sensor range for polarization and a sensor range for brightness, arranged next to the sensor range for polarization, wherein the brightness determined in the polarization sensor is used as a reference signal for the evaluation of the brightness information of the brightness sensor.

14. The device as claimed in claim 1, comprising at least two ranges for polarization measurement, a plurality of sensor ranges being arranged in such a way that signals from a plurality of independent signal sources can be measured.

15. The device as claimed in claim 1, comprising at least one sensor range for polarization and at least one sensor range for brightness arranged next to the latter, wherein the brightness determined by a polarization sensor is used as a reference signal for the evaluation of a brightness information item, wherein the sensor ranges are arranged in such a way that signals from a plurality of independent signal sources can be measured.

16. The device as claimed in claim 1, comprising at least one sensor for polarization and one sensor for color on a commonly used sensor area.

17. The device as claimed in claim 1, wherein the energy which is necessary for the measurement is transmitted in a wireless fashion to the device.

18. The device as claimed in claim 1, wherein the measured signals are transmitted in a wireless fashion by the device.

19. The use of a device as claimed in claim 13 for measuring rotational angles and/or revolutions.

20. A device comprising:
   more than one rotatable wheels and in each case having measuring wheels which are connected thereto mechanically by a ratio of at least 2:1,
   at least one light source and
   more than one polarization sensor,
   the measuring wheels being at least partially transparent and polarization-maintaining, parts of the measuring wheels being configured as pole filters, the measuring wheels at least partially overlapping, it being possible for light which exits the light source to be polarized by the pole filters of the measuring wheels and received by the polarization sensors, it being possible for the light to penetrate a plurality of measuring wheels, and the light which is received by a polarization sensor being polarized by just one of the pole filters.

* * * * *